United States Patent [19]

Vizziello et al.

[11] 3,901,115

[45] Aug. 26, 1975

[54] FEED AND GUIDE APPARATUS FOR ANGLE END CUTTING

[75] Inventors: Vito M. Vizziello, Hamden, Conn.; Charles A. Bouteiller, Darrington, Mass.

[73] Assignee: New England Log Homes, Inc., New Haven, Conn.

[22] Filed: June 28, 1974

[21] Appl. No.: 483,989

Related U.S. Application Data

[63] Continuation of Ser. No. 358,679, May 9, 1973, abandoned.

[52] U.S. Cl. .................. 83/449; 83/467; 83/477.2; 83/485
[51] Int. Cl. ............................................. B27b 5/18
[58] Field of Search ......... 83/467, 477, 477.2, 581, 83/733, 485, 449, 473

[56] References Cited
UNITED STATES PATENTS

| | | | |
|---|---|---|---|
| 1,248,805 | 12/1917 | Casey et al. | 83/477 |
| 2,353,088 | 7/1944 | Schutz | 83/485 X |
| 2,796,896 | 6/1957 | Ketonen | 83/449 X |
| 3,049,955 | 8/1962 | Moore | 83/449 X |
| 3,057,240 | 10/1962 | DeWitt | 83/473 X |
| 3,105,528 | 10/1963 | Loughridge | 83/477 X |
| 3,209,798 | 10/1965 | Coleman | 83/485 |
| 3,487,863 | 1/1970 | Buckley | 83/581 X |

*Primary Examiner*—Frank T. Yost
*Attorney, Agent, or Firm*—DeLio and Montgomery

[57] ABSTRACT

Apparatus for use with a vertically positioned radial saw for angle end cutting of an elongated building construction workpiece or the like, comprising: a worktable having a slot to receive the cutter head of the radial saw, and a bed assembly for cradling and feeding the workpiece to the cutter head, wherein the bed assembly is pivotally connected at one end to the worktable for generally horizontal pivoting of the bed assembly about the worktable at predetermined angles thereto, whereby the cutting angle is predetermined.

5 Claims, 4 Drawing Figures

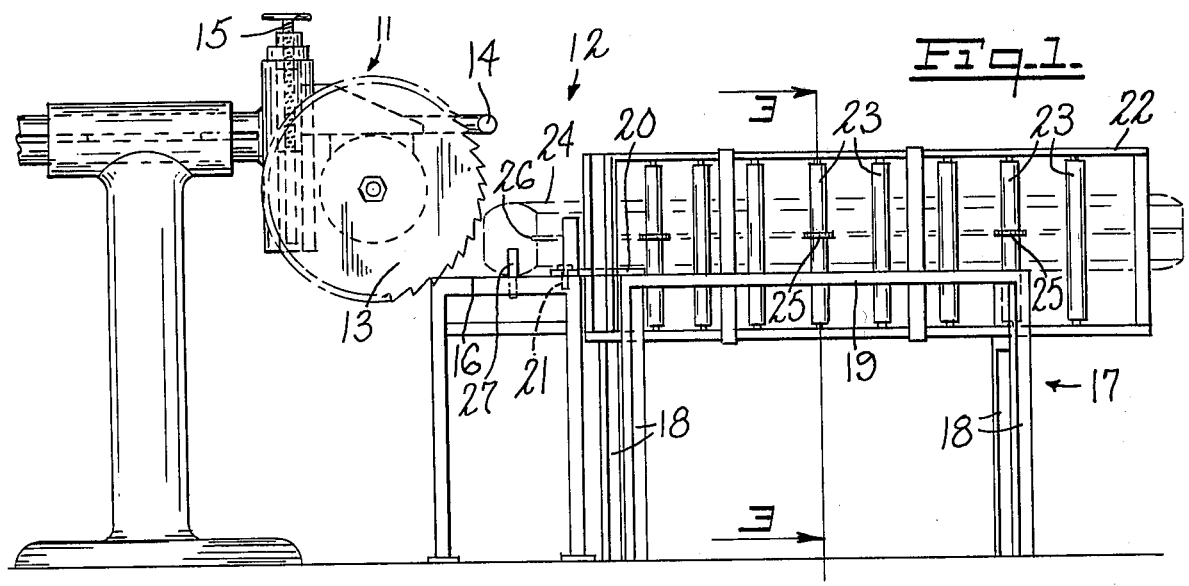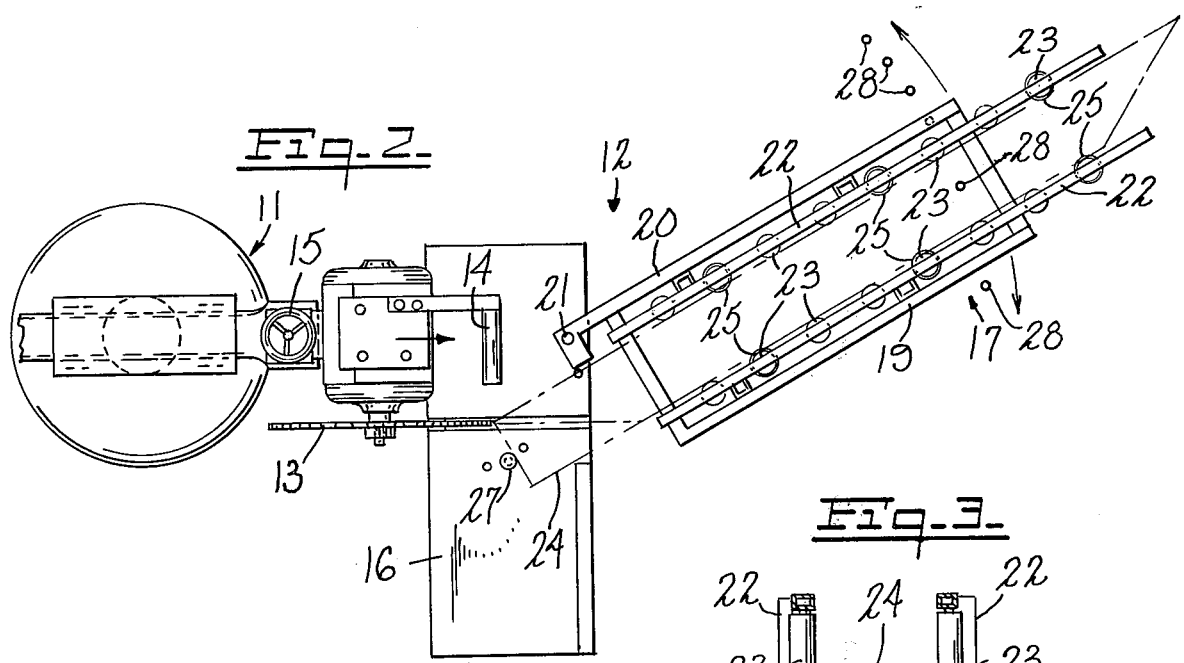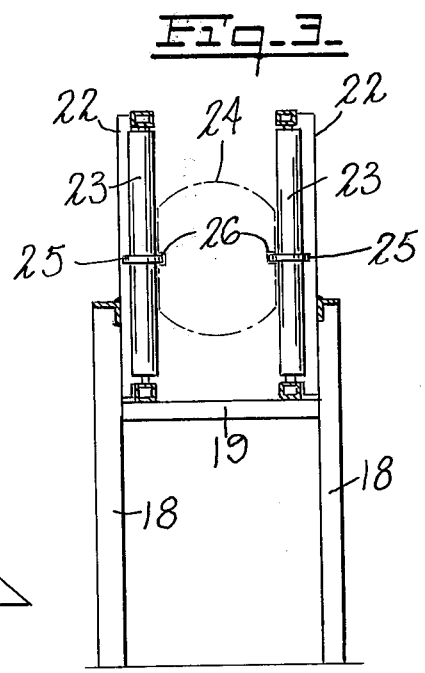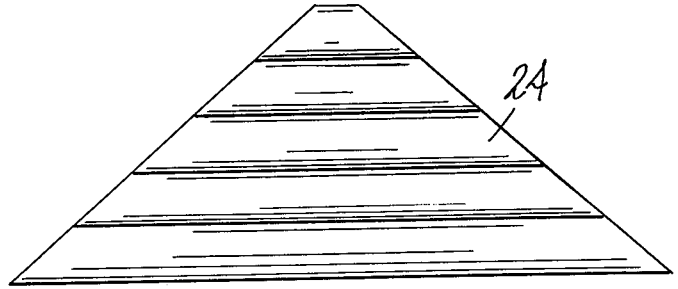

FEED AND GUIDE APPARATUS FOR ANGLE END CUTTING

This is a continuation of application Ser. No. 358,679, filed May 9, 1973, and now abandoned.

BACKGROUND OF THE INVENTION

This invention relates to woodworking machines and associated apparatus, and in particular to improvements in apparatus for use with vertically positioned radial saws for angle end cutting of an elongated building construction workpiece.

For angle end cutting of workpieces of relatively small dimensions, such as portions of furniture and the like, various types of guide devices are available, such as mitering frames. However, when it is desired to angle cut the end of an elongated workpiece for use in building construction, feeding and guiding devices such as mitering boxes and the like, if constructed on the required scale would take up too much space and would be prohibitively costly. Accordingly, there is need for apparatus for feeding and guiding large dimensioned workpieces of the building construction type to a radial saw for precise and efficient angle end cutting.

The whole-log building construction industry is typical of such industries. In this industry whole logs are planed on two opposing sides, the remaining sides being substantially maintained in their natural, rounded condition. One or both planed sides of the logs are conventionally grooved longitudinally of the logs to receive splines for forming weathertight joints between the logs when stacked one on the other in forming the wall or gable of a log building. In the case of a gable, the ends of each log must be angle cut to correspond with the predetermined pitch of the roof for the building. The apparatus of the present invention is especially adapted for angle end cutting of workpieces of this type.

OBJECTS AND SUMMARY

An object of the invention therefore is to provide new and improved apparatus for use with a vertically positioned radial saw so that elongated building construction workpieces may be angle cut with efficiency and precision.

Another object is to provide new and improved feed and guide apparatus for use in efficient and accurate angle end cutting of double planed and grooved whole logs used in construction of whole log buildings.

These and other objects, features and advantages of the invention will be apparent from the specification which follows.

In summary outline, the apparatus of the invention comprises a worktable having a slot to receive the cutter head of a vertically positioned radial saw, and a bed assembly for cradling and feeding the workpiece to the cutter head of the radial saw, wherein the bed assembly is pivotally connected at one end to the worktable for generally horizontal pivoting of the bed assembly about the worktable at predetermined angles thereto. Consequently, the angle at which the workpiece is cut when contacted by the cutter head will also be predetermined.

The invention accordingly comprises the features of construction, combination of elements, and arrangement of parts which will be exemplified in the construction hereinafter set forth, and the scope of the invention will be indicated in the claims.

DETAILED DESCRIPTION

For a fuller understanding of the nature and objects of the invention, reference is had to the following description taken in conjunction with the accompanying drawing, in which:

FIG. 1 is a side view of apparatus of the invention;

FIG. 2 is a top plan view of the apparatus of FIG. 1;

FIG. 3 is a vertical section along the line 3—3 of FIG. 1; and

FIG. 4 is an elevational view of a gable end wall for a log building, comprising a plurality of logs the ends of which have been cut with use of apparatus of the invention.

With reference to FIGS. 1–4, a conventional vertically positioned radial saw 11 is positioned adjacent feed and guide apparatus 12 of the invention. The radial saw 11 thus is set for a vertical cut and for horizontal displacement of its cutter head 13. The horizontal displacement of the cutter head 13 may be effected manually, hydraulically or otherwise. The manual operation is represented in FIGS. 1 and 2 by the handle 14 used to reciprocate the cutter head 13 horizontally into cutting engagement with a workpiece. The height of the cutter head may be adjusted as desired, for example, by a conventional turnscrew 15.

The feed and guide apparatus 12 of the invention includes a worktable 16 which may be anchored to the ground, and a bed assembly 17 adapted for cradling and feeding a workpiece to the cutter head 13. Worktable 16 is suitable slotted, as shown, to receive the cutter head 13 during the cutting operation.

The bed assembly 17 includes a plurality of legs 18 and a plurality of horizontally arranged support members 19 affixed to the legs. The bed assembly is pivotally connected at one end, as through an elongated outrigger-like member 20, to the worktable 16 at pivot point 21 so that the entire bed assembly may be pivoted generally horizontally about the worktable at predetermined angles thereto. The bed assembly 17 may include various other structural members for additional support and reinforcement as desired. It will also be evident that, in place of the plurality of horizontal support members 19, a continuous sliding surface may be utilized, if it is desired to provide a chute or similar support member for transporting a workpiece to the worktable 16.

Supported on horizontal support members 19 is a pair of roller conveyors 22. The roller conveyors are vertically mounted in spaced apart relationship and may also be affixed to other portions of the bed assembly, such as legs 18. With the axes of the rollers 23 of the conveyors in parallel, it will be evident that an elongated workpiece such as a log 24 may be channeled therebetween to the worktable 16. The log 24 may slide on one or more support members 19 or a similar roller conveyor 23 may be horizontally positioned on support members 19 for this purpose.

However, when the elongated workpieces to be end cut are whole logs, the usually uneven lower surface of the log will prevent smooth displacement over such support members 19 or roller conveyor unless, of course, the lower surface of the log in contact with the support members 19 or roller conveyor has been planed. In a preferred embodiment of apparatus of the invention, at least some of the rollers 23 of the vertically positioned roller conveyors 22 have flanges 25 generally centrally positioned thereon for rotation with each of the rollers. The flanges adapt the rollers to mate with grooves 26 cut longitudinally in opposing planed surfaces of the log 24. The log 24 is thus suspended a short distance above the support members 19 so that it can be accurately and smoothly fed and guided to the worktable 16 for end cutting. A stop member such as a pin 27 is mounted on worktable 16 in order to accurately position the ends of the log 24 for the angle end cutting.

In operation, the entire bed assembly 17 pivots with outrigger member 20 about pivot point 21 so that the log 24 may be presented to the cutter head 13 at the desired angle for end cutting. The floor or ground below the bed assembly 17 (FIG. 2) may be provided with suitable indexing indicia 28 set at predetermined compass points for the purpose of quickly establishing the desired cutting angle. A previously planed and grooved log 24 is then fed through the pair of roller conveyors 22 such that the flanges 25 on the rollers 23 mate with the grooves 26 on opposing sides of the log. The log 24 is thus moved into position against pin 27 on table 16 and the cutter head 13 is moved across the end of the log to cut the gable end at the predetermined angle. Log 24 then may be retracted and reversed in direction for cutting of the other end. In this manner a plurality of logs of appropriate lengths may be end cut for construction of a gable end wall as illustrated in FIG. 4.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

What is claimed is:

1. Apparatus for use with a vertically positioned radial saw for angle end cutting of an elongated building construction workpiece or the like, comprising:
    a worktable having a slot to receive the cutter head of said radial saw, and
    a bed assembly for cradling and guiding said workpiece to said cutter head, said bed assembly including a supporting frame and legs therefor, the frame being pivotally connected at one end to said worktable for generally horizontally pivoting of said bed assembly about said worktable at predetermined angles thereto, and substantially vertically and parallelly disposed guide means mounted on said supporting frame for guiding said workpieces to a position adjacent said slot at said predetermined angle to the cutter head.

2. Apparatus as in claim 1 wherein said guide means comprises a pair of roller conveyors, said conveyors being spaced apart with the axes of said rollers generally parallel, whereby said workpiece is guided therebetween.

3. Apparatus as in claim 2 wherein a plurality of the rollers of at least one of said conveyors have flanges thereon arranged to engage grooves previously cut longitudinally in said workpiece, whereby said workpiece is suspended between said conveyors.

4. Apparatus as in claim 3 wherein a plurality of rollers of each of said conveyors have said flanges thereon.

5. Apparatus as in claim 1, including an abutment member on said worktable for stopping said workpiece at a predetermined position prior to cutting of said workpiece.

* * * * *